May 20, 1924.                                                    1,494,466
J. EDMAN
AIR COOLING SYSTEM FOR EXPLOSIVE ENGINES
Original Filed June 30, 1919    2 Sheets-Sheet 2

INVENTOR.
JOHN EDMAN
BY HIS ATTORNEYS.
Williamson Merchant

Patented May 20, 1924.

1,494,466

UNITED STATES PATENT OFFICE.

JOHN EDMAN, OF MINNEAPOLIS, MINNESOTA, ASSIGNOR TO AIR COOLING MOTOR CO., OF MINNEAPOLIS, MINNESOTA, A CORPORATION OF MINNESOTA.

AIR-COOLING SYSTEM FOR EXPLOSIVE ENGINES.

Application filed June 30, 1919, Serial No. 307,833. Renewed October 27, 1923.

*To all whom it may concern:*

Be it known that I, JOHN EDMAN, a citizen of the United States, residing at Minneapolis, in the county of Hennepin and State of Minnesota, have invented certain new and useful Improvements in Air-Cooling Systems for Explosive Engines; and I do hereby declare the following to be a full, clear, and exact description of the invention, such as will enable others skilled in the art to which it appertains to make and use the same.

My invention relates to internal combustion engines and has for its object to provide efficient means for cooling the piston and preferably also, the cylinders thereof. Generally stated, the invention consists of the novel devices and combination of devices hereinafter described and defined in the claims.

Hitherto, the cylinders of the internal combustion engine have been cooled sometimes by the use of water and sometimes by a forced circulation of air, but generally, no means has been provided directly for cooling the pistons. As the cylinders are kept cooler than the pistons, the latter will expand out of proportion to the expansion of the cylinders, and when the engines run at high speed or under a high duty, much trouble has been caused by sticking or so-called, "freezing" of the pistons in the cylinders.

My invention provides means whereby, a forced circulation of cold air through a chamber of the engine is produced, thereby, keeping pistons at proper temperature. This means for cooling the piston may be used in connection with cylinders, that are air cooled or cooled by circulation of water.

The invention is illustrated in the accompanying drawings, wherein like characters indicate like parts throughout the several views.

Referring to the drawings.

Figure 1:
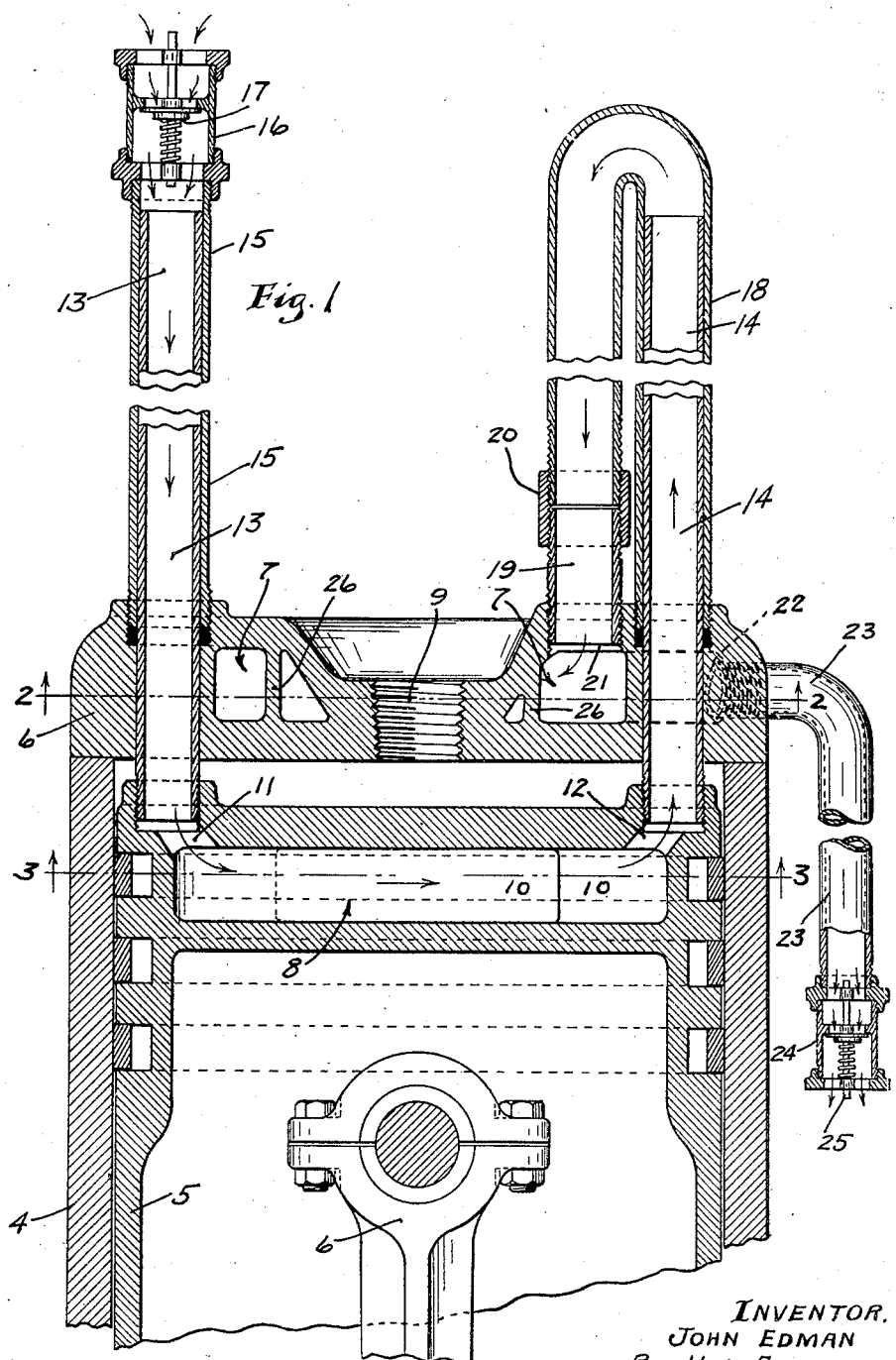
Fig. 1 is a vertical or axial section through the cylinder and piston of an internal combustion engine, some parts being broken away, and illustrating my invention applied thereto.
Figure 2:
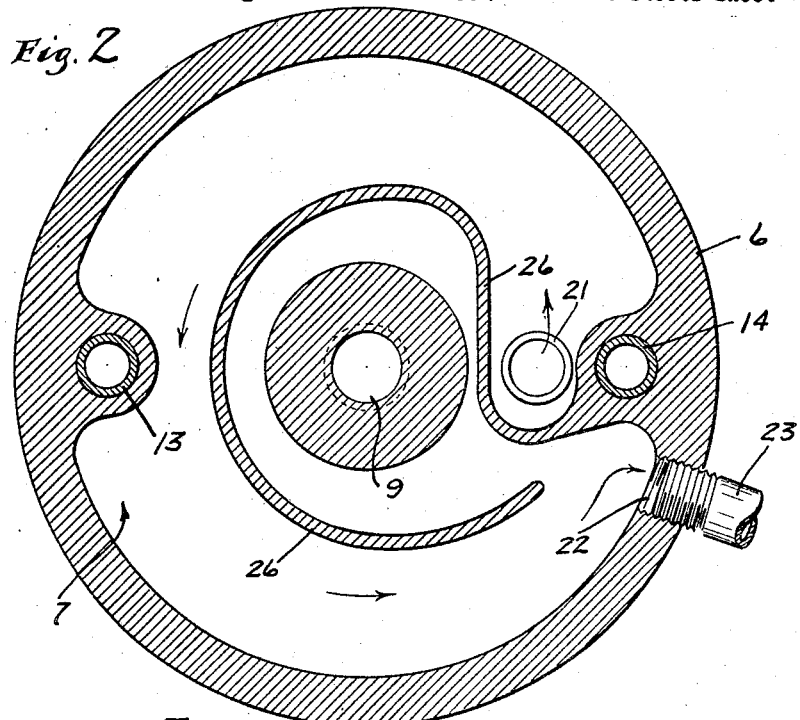
Fig. 2 is a horizontal section on the line 2—2 of Fig. 1.
Figure 3:
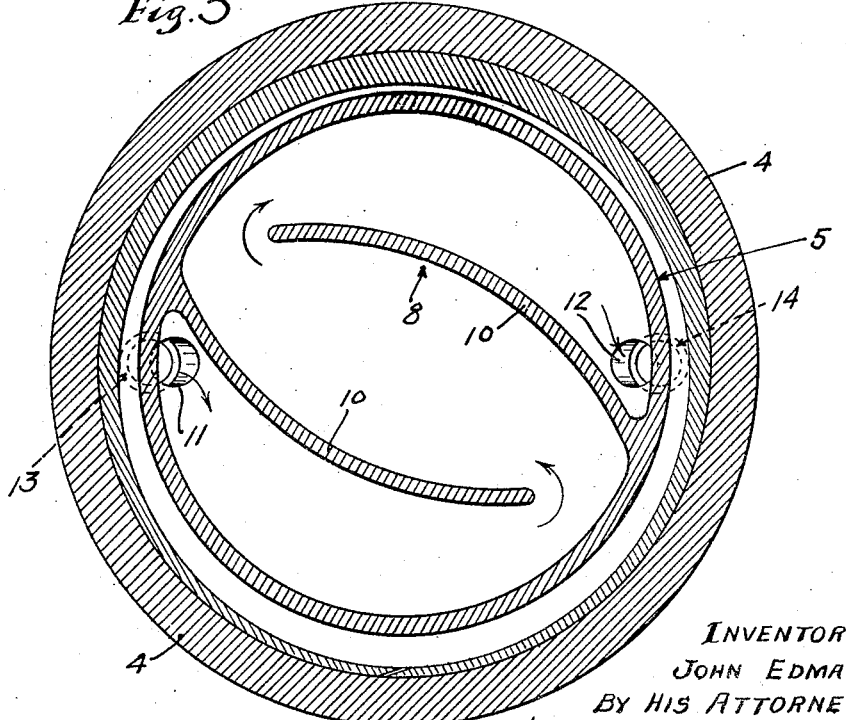
Fig. 3 is a horizontal section on the line 3—3 of Fig. 1.

As a further feature of this invention, I provide means whereby the air circulated through the piston will also be circulated through the head or other portions of the cylinder, thereby, keeping the cylinder also relatively or comparatively cool. The numeral 4 indicates the cylinder, and the numeral 5 the piston of the engine. The numeral 6 indicates the usual connecting rod.

In accordance with my invention, the cylinder 4 in its head 6 is formed with a chamber 7, and the piston 5 in its head is formed with a chamber 8. The cylinder head 6 at its axis is provided with a solid hub surrounded by the chamber 7 and through which hub is extended a threaded seat 9 for the customary spark plug not shown. The chamber 8 in the piston head has internal partitions or baffle flanges 10 that overlap so that the air in passing through said chamber will be caused to take tortuous course on its way from intake port 11 to outlet port 12, both of which ports are formed in the top web of said piston head.

Parallel, air intake and outlet tubes 13 and 14 at their lower or inner ends are attached to the piston head and respectively communicate with the ports 11 and 12. These tubes 13 and 14 are also parallel to the axis of the piston, and both thereof work through the solid portion of the cylinder head 6. The upper or outer portion of tube 13 works telescopically within an outer tube 15, the end of which is threaded or otherwise, secured rigidly to the cylinder head 6. At its extended end, outer tube 15 is provided with a valve casing 16, in which is a yieldingly closed check valve 17. The valve 17 will open to permit air to be drawn into the tubes 13 and 15, but will close to prevent a reverse flow. The said tubes, 13 and 15 and said valve therefore, operate as pump elements as will presently be more fully described.

The outer portion of outlet tube 14 works telescopically in the co-operating leg of a U-shaped outer tube 18. The first noted leg of this tube 18 is screwed or otherwise rigidly secured to cylinder head 6, and its other leg, by a short tube 19 and coupling 20, is connected to an air intake port 21 of the chambers 7 in the head of the cylinder 6. The chamber 7 in the cylinder head 6 is provided with a good size port 22, that is connected to a discharged or exhausted pipe 23 that leads therefrom, and to the end of which, as shown, is secured a valve casing 24. A yieldingly closed check valve 25 in valve casing 24 permits air to be discharged from tube 23 but checks the reverse flow.

Air chamber 7 in the cylinder head 6 is provided with an internal curved and nearly continuous deflecting partition or web 26 that causes the air to take the circular course in passing from intake port 21 to outlet port 22.

*Operation.*

The operation is probably obvious from the foregoing description, but briefly described is as follows: When the piston is reciprocated, the tubes 13 and 14 will, of course, move therewith and will slide telescopically within the co-operating tube 16 and 18 respectively. When piston makes its working stroke, air will be drawn into tube 13 and 15 through said valve controlled passage, and at such time such valve 25 will close to prevent an inflow of air through tube 23.

When piston makes its compression stroke or reverse movement, check valve 17 will close and the air drawn into the tubes 13 and 15, and into the chambers of the piston and cylinder, and into the tubes 14 and 18 will be put under compression and the greater part thereof will be exhausted through pipe 23, said valve 25 at this time opening freely to permit such discharge. By the circulation of cold air through the cylinder and piston, as above described, the air is brought into contact with a large amount of surface of both thereof, and as the circulation of air will be proportioned to the speed of the piston, both the cylinder and the piston will be kept properly cooled. Of course, it is not desirable to keep either, thereof, cold, but only to prevent them from becoming too high in temperature and particularly to cause equal expansion and contraction of the cylinder and piston. These objects are accomplished by the above described means.

What I claim is:

1. The combination with the cylinder and piston of an internal combustion engine, said piston and the head of said cylinder having an air chamber therein, of parallel air intake and discharge tubes connected to the air chamber of said piston, movable with said piston and working through the cylinder head, an outer air intake tube fixed to the cylinder head and in which said air intake tube works telescopically, said outer air intake tube being connected to the atmosphere and having an inwardly opening check valve, a U-shaped tube fixed to the cylinder head, opening into the air chamber of said head and having a portion in which the air discharge tube from said piston chamber works telescopically, and a final air discharge conduit leading from the air chamber of the cylinder head and equipped with an outwardly opening check valve.

2. The structure set forth in claim 1, said parallel air intake and discharge tubes connected to the piston fitting in and slidable respectively in the outer air intake tube and the U-shaped tube secured to the cylinder head.

In testimony whereof I affix my signature in presence of two witnesses.

JOHN EDMAN.

Witnesses:
 CLARA DEMAREST,
 F. D. MERCHANT.